Dec. 15, 1953
E. BRAUN
2,662,433
DEVICE FOR SIMULTANEOUSLY CLAMPING
AND RELEASING PLURAL WORKPIECES
Filed Feb. 8, 1950
2 Sheets-Sheet 1
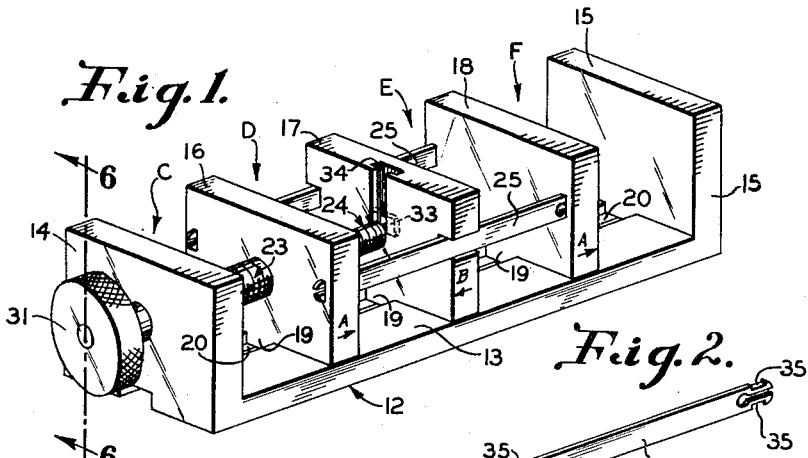
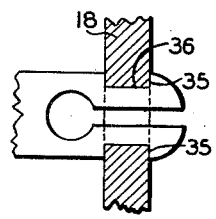
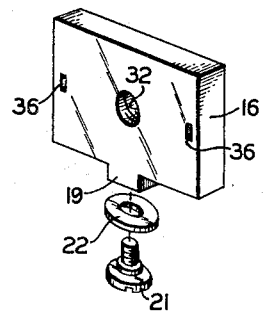
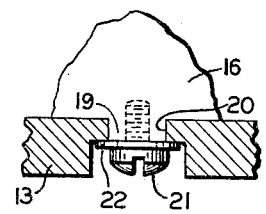
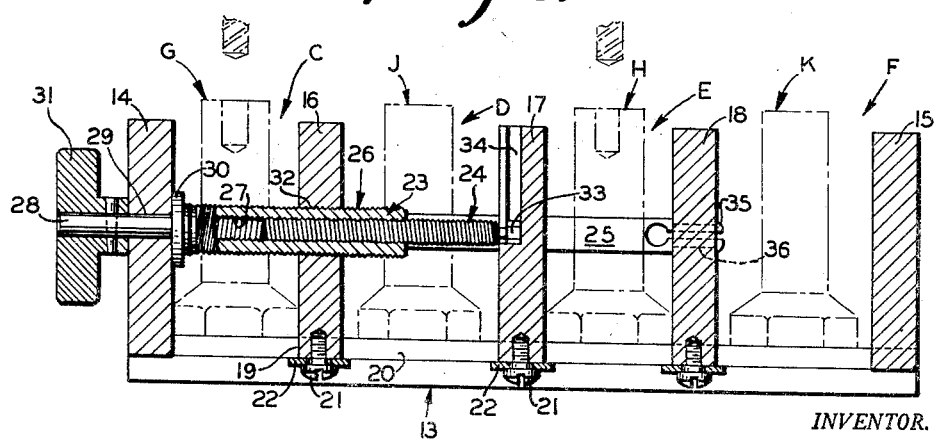
INVENTOR.
EDWARD BRAUN
BY
Thomas S. Ross
ATTORNEY.

Dec. 15, 1953   E. BRAUN   2,662,433
DEVICE FOR SIMULTANEOUSLY CLAMPING
AND RELEASING PLURAL WORKPIECES
Filed Feb. 8, 1950   2 Sheets-Sheet 2

*INVENTOR.*
EDWARD BRAUN
BY
Thomas S. Ross
ATTORNEY.

Patented Dec. 15, 1953

2,662,433

UNITED STATES PATENT OFFICE 2,662,433

DEVICE FOR SIMULTANEOUSLY CLAMPING AND RELEASING PLURAL WORKPIECES

Edward Braun, Norwalk, Conn.; Caroline A. Braun administratrix of said Edward Braun, deceased Application February 8, 1950, Serial No. 143,115

3 Claims. (Cl. 81—21)

1

The present invention relates broadly to a mechanical movement, and is more particularly concerned with a vise or similar clamping device having a plurality of movable clamping jaws which are positioned in such a manner that as one, two or more articles or work pieces are simultaneously clamped or held, other articles or work pieces are simultaneously released.

Such a vise or clamping device enables high speed production of work pieces which must be rigidly held during operations such as drilling, milling, grinding or like procedures.

Another object of the invention resides in the provision of a clamping device having a plurality of movable jaws which are actuated by a double screw and tie rods and at least one fixed jaw in which one screw is journaled.

Still another object of the invention is to provide a multiple jaw vise having means for positioning the jaws regardless of whether they move parallel or angularly relative to one another.

Still another object of the invention is found in the provision of a multiple jaw vise comprising a plurality of adjacently disposed article receiving pockets or areas whereby a plurality of work pieces may be clamped within some pockets while other work pieces are simultaneously released from other pockets.

Still further objects of the invention are to provide a clamping device which is extremely compact in design; one which includes separable parts which may be quickly and conveniently assembled or disassembled; one that is simple and practical in construction; strong and reliable in use; one that is relatively inexpensive to manufacture, neat and attractive in appearance, and otherwise well adapted for the purposes for which it is intended.

The invention and further features of novelty will be better understood and appreciated from the following detailed description of two embodiments shown in the accompanying drawings, in which:

Fig. 1 is a perspective view of a vise or clamping device embodying the invention wherein the multiple jaws move parallel relative to one another.

Fig. 2 is a perspective detail view of one of the tie rods for the movable jaws or plates shown in Fig. 1.

Fig. 3 is a fragmentary detail view, partly in section and partly in elevation to illustrate the manner in which the tie rods are connected with the movable jaws.

Fig. 4 is a perspective view of one of the movable jaws or clamping plates and its mounting stud and washer.

Fig. 5 is a fragmentary detail partly in vertical section illustrating the manner in which the movable clamping jaws are attached to and guided by the base support.

Fig. 6 is a longitudinal vertical sectional view of the invention taken substantially on the plane indicated by line 6—6 of Fig. 1 looking in the direction indicated by the arrows.

Figure 7:
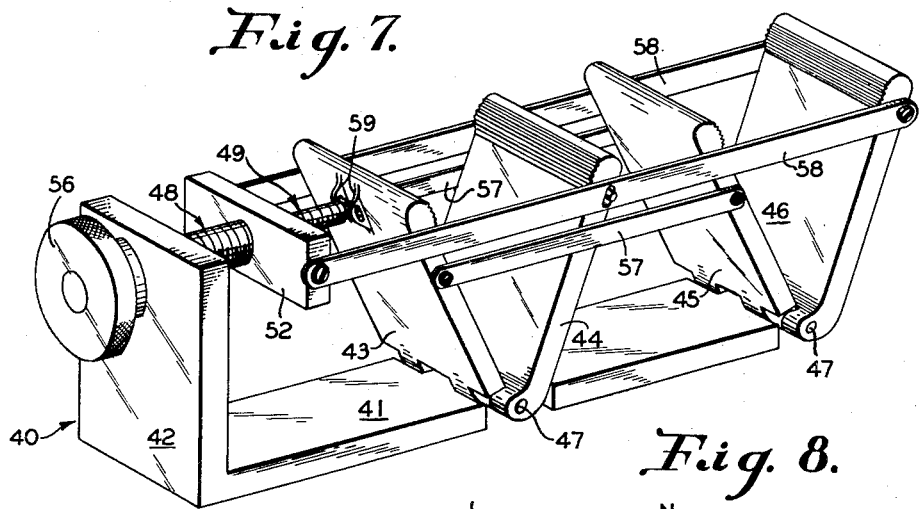
Fig. 7 is a perspective view of a modification of the invention wherein the clamping jaws or plates are pivoted for angular movement relative to one another in contrast to the parallel movement of the jaws shown in Fig. 1.

Referring now to the drawings in detail, and for the present to the form of the invention illustrated in Figs. 1 to 6 respectively, the reference numeral 12 indicates the vise or clamping device generally, including a U-shaped support comprising a base 13 having upwardly extending parallel end walls or plates 14 and 15 respectively. As shown in Fig. 1 there are three movable plates or jaws 16, 17 and 18 respectively, between the stationary end walls or plates 14 and 15, each of which jaws has a downwardly extending guide portion or neck 19. The necks 19 are slidably received within a longitudinally inverted T-shaped slot 20 centrally disposed within the base 13 as clearly illustrated in Fig. 5. The movable plates or jaws 16, 17 and 18 respectively, are slidably mounted upon the base 13 and retained in sliding relation therewith by removable fasteners such as the shoulder screws 21 and washers 22.

The jaws 16, 17 and 18 are moved by a pair of threaded screws 23 and 24 and tie rods or links 25 in a manner presently described. Screw 23 is provided with an external left hand screw thread 26 and an internal right hand threaded bore 27 as clearly shown in the sectional view in Fig. 6. The reduced end 28 of screw 23 is rotatably journaled in an aperture 29 provided in the stationary wall 14, and a shoulder portion 30 provided on the screw limits its outward movement relative to the end wall 14. A hand wheel 31, pinned to the reduced end 28 of screw 23, serves as one means for rotating the screw 23 within wall 14.

It will be apparent from Fig. 6 that screw 23 is threadedly received by the threaded hole 32 in jaw 16, and that one end of screw 24 is received within the threaded bore 27 of screw 23. The outer end of screw 24 is provided with a square head 33 which fits into the T-shaped slot 34 formed in the jaw 17. Thus screw 24 is held against rotation relative to jaw 17.

As clearly shown in Fig. 1, the movable jaws 16 and 18 are connected to one another to move in unison through a pair of tie rods or links 25, the ends of which are slotted and provided with notches 35 as best shown in Fig. 3. The jaws have rectangular holes 36 dimensioned to fit the notches 35 of links 25, and it will therefore be apparent that the tie rods are thus quickly attached to the jaws by merely forcing the slotted ends of the links into the rectangular holes until the vertical walls of the notches align with the rectangular holes in the jaws.

Operation

From the detailed description thus far given of the vise-like clamping device shown in Figs. 1 to 6 inclusive, it will now be understood that when hand wheel 31 is rotated in a clockwise direction, as viewed from the left end of Fig. 1, the screw 23 will also be rotated clockwise thus moving the internal screw 24 to the left or in a direction toward the stationary end wall or plate 14. This rotary movement of screw 23 and longitudinal movement of screw 24 actuates the movable jaws 16, 17 and 18 causing them to slide upon base 13 in the following manner. Jaws 16 and 18 will be moved in unison and parallel relative to one another in the direction indicated by the arrows A (Fig. 1), while jaw 17 is moved in the direction indicated by the arrow B.

The device illustrated in Figs. 1 to 6 inclusive shows four available pocket-like clamping areas designated C, D, E and F respectively. Clamping area C is defined by stationary end wall or jaw 14 and movable jaw 16, clamping area D is defined by movable jaws 16 and 17, clamping area E is defined by movable jaws 17 and 18, and clamping area F is defined by movable jaw 18 and stationary end wall or jaw 15.

Assume now that the clamping device illustrated in Figs. 1 to 6 is to be used for high production drilling operations. For this use, work pieces to be drilled, such as those indicated by dotted lines at G and H, may be simultaneously clamped within areas C and E while similar work pieces such as indicated at J and K are positioned in the areas D and F to be clamped upon release of the work pieces G and H and vice versa.

A modification of the invention shown in Figs. 7 to 11 inclusive illustrates a vise-like clamping device having multiple clamping jaws which are positioned angularly relative to one another.

Referring to the perspective view shown in Fig. 7, reference numeral 40 indicates the modified vise or clamping device generally, including an L-shaped support comprising a base 41 having an upwardly extending wall or plate 42 at one end thereof. Each of the four movable clamping jaws or plates, designated 43, 44, 45 and 46 respectively, have their lower end pivotally mounted to the base 41 by the hinge pins 47 as clearly illustrated in Fig. 9 and are moved angularly relative to one another by a pair of screws 48 and 49 very similar to the screws 23 and 24 shown in Figs. 1 to 6. Screw 48 has an internally threaded bore 50 to receive the right hand threaded screw 49 and an external left hand thread 51 upon which the cross bar 52 is threadedly engaged. Screw 48 is further provided with a reduced end 53 which is rotatably journaled in an aperture 54 provided in stationary wall 42, and a shoulder 55 to limit outward movement of the screw relative to the wall 42. A hand wheel 56, fixed to the reduced end 53 of screw 48 enables manual rotation of the screw whereupon the screw 49 is moved longitudinally to actuate the jaws 43 and 45. The jaws 43 and 45 are connected to move in unison by a pair of tie bars 57 and the jaws 44 and 46 are also moved in unison by a pair of tie bars 58, which latter bars are also pivotally connected to the cross bar 52.

The outer end of screw 49 is flattened to fit between the ears 59 projecting from jaw 43, and a pin 60 carried by the flattened end of the screw slides in the elongated slots 61 formed in the ears 59.

It will now be apparent that when hand wheel 56 is rotated counterclockwise, as viewed from the left in Fig. 7, screw 48 will be rotated counterclockwise thus moving the cross bar 52 towards the wall 42 and in turn, through the links 58, the jaws 44 and 46 will be angularly moved toward the jaws 43 and 45 on the hinge pins 47.

Figure 8:
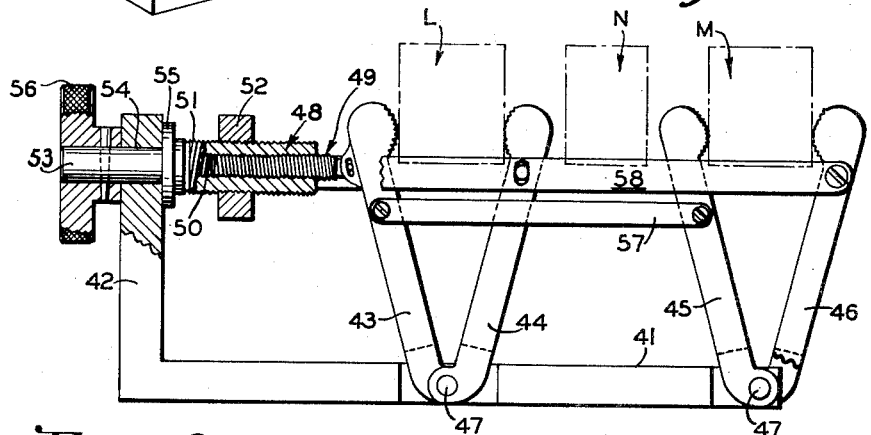
Fig. 8 is a side elevational view of Fig. 7 partly in longitudinal vertical section.
Figure 9:
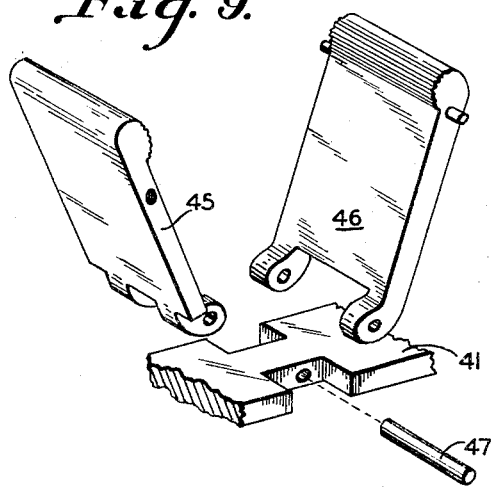
Fig. 9 is an exploded perspective view of two of the clamping jaws or plates shown in Fig. 7 together with their hinge pin and a portion of the base support.
Figures 10, 11:
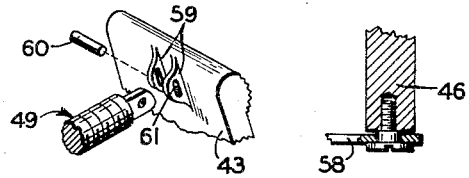
Fig. 10 is a fragmentary perspective view illustrating the pivotal connection of the inner screw shaft with its associated clamping plate or jaws, and, Fig. 11 is a detail view, partly in horizontal section, illustrating one method for pivotally connecting the ends of the tie rods with the clamping plates or jaws of Fig. 7.

Counterclockwise movement of screw 48 will move the screw 49 to the right, as viewed in Fig. 8, and in turn the jaws 43 and 45 will be angularly moved toward the jaws 44 and 46 on the hinge pins 47.

It will now be clear that upon counterclockwise rotation of hand wheel 56, work pieces such as L and M shown by dotted lines, may be simultaneously clamped between the pairs of jaws 43—44 and 45—46 respectively and unclamped upon clockwise rotation of the hand wheel 56. If desired, a work piece (indicated at N) may be clamped between the jaws 44—45 simultaneously with the release of work pieces L and M.

In view of the foregoing description, taken in conjunction with the accompanying drawings, it is believed that a clear understanding of the novel clamping device will be quite apparent to those skilled in this art. A more detailed description is accordingly deemed unnecessary. It is to be understood, however, that even though there is herein shown and described two preferred embodiments of the invention, the same is susceptible to certain changes fully comprehended by the function of the invention as herein disclosed and by the scope of the appended claims.

The invention claimed is:

1. In a clamping device of the character described, the combination comprising: a base supporting member; an end wall rigidly attached to one end of said base; a plurality of clamping jaws mounted for movement relative to said base; links connecting alternate clamping jaws with one another; and means to move said jaws to simultaneously effect clamping action between certain of said jaws and an unclamping action between other of said jaws, said last named means including said links and a pair of screws one threaded within the other substantially as described.

2. In a clamping device as specified in claim 1 wherein the outer screw of said pair of screws is rotatably journaled in said end wall, and one end of the inner screw of said pair of screws is connected with one of said clamping jaws.

3. In a clamping device of the character described, the combination of: a base supporting member; an end wall rigidly attached to one end of said base; a plurality of clamping jaws certain of which are mounted for movement relative to said base, said jaws defining alternate clamping and unclamping areas; links connecting alternate jaws with one another; and means including said links and a pair of screws one threaded within the other to effect clamping action within the clamping areas simultaneously with unclamping action within the unclamping areas upon rotation of the outer of said screws.

EDWARD BRAUN.

References Cited in the file of this patent

UNITED STATES PATENTS

| Number | Name | Date |
|---|---|---|
| 620,495 | Ramseaur, Jr. | Feb. 28, 1899 |
| 752,656 | Dalton | Feb. 23, 1904 |
| 866,296 | McIntyre | Sept. 17, 1907 |
| 920,797 | Werner | May 4, 1909 |
| 1,331,315 | Brown | Feb. 17, 1920 |
| 1,823,537 | Gaudreau | Sept. 15, 1931 |
| 2,370,042 | Jesionowski | Feb. 20, 1945 |

FOREIGN PATENTS

| Number | Country | Date |
|---|---|---|
| 5,432 | Great Britain | Mar. 6, 1907 |
| 20,858 | Great Britain | Sept. 28, 1903 |